(12) United States Patent
Huang et al.

(10) Patent No.: US 7,045,985 B2
(45) Date of Patent: May 16, 2006

(54) RELUCTANCE FORCE BRAKE DEVICE

(75) Inventors: Wen-Nan Huang, Hsinchu (TW);
Ching-Cheng Teng, Hsinchu (TW);
Wan-Pei Chen, Hsinchu (TW);
Chih-Hsing Fang, Hsinchu (TW);
Mu-Ping Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/911,689

(22) Filed: Aug. 5, 2004

(65) Prior Publication Data
US 2005/0194923 A1    Sep. 8, 2005

(30) Foreign Application Priority Data
Mar. 2, 2004    (TW) ............... 93105439 A (51) Int. Cl.
*H02P 3/08* (2006.01)
(52) U.S. Cl. .............. 318/701; 318/362; 188/162
(58) Field of Classification Search ............... 318/254, 318/701, 159, 362, 370–373, 383; 310/106; 188/161, 162, 164
See application file for complete search history.

(56) References Cited
U.S. PATENT DOCUMENTS

| | | | |
|---|---|---|---|
| 3,560,817 A * | 2/1971 | Amato | 318/138 |
| 5,548,196 A * | 8/1996 | Lim | 318/701 |
| 5,568,023 A * | 10/1996 | Grayer et al. | 318/139 |
| 6,148,967 A * | 11/2000 | Huynh | 188/164 |
| 6,253,141 B1 * | 6/2001 | McCann | 701/71 |
| 6,539,782 B1 * | 4/2003 | Drecq et al. | 73/116 |

OTHER PUBLICATIONS

Robert B. Inderka et al., "Control of Switched Reluctance Drives for Electric Vehicle Applications", IEEE Transactions on Industrial Electronics, vol. 49, No. 1, Feb. 2002.

Osamu Ichinokura et al., "Dynamic Simulation Model of Switched Reluctance Generator", IEEE Transactions on Magnetics, vol. 39, No. 5, Sep. 2003.

* cited by examiner

*Primary Examiner*—Bentsu Ro
(74) *Attorney, Agent, or Firm*—Harness, Dickey & Pierce, PLC (57) ABSTRACT

A reluctance force brake device applies the coupling and combining concept of the reluctance braking unit to the original rotating source or say mechanical rotation axle for kinetic energy output. The reluctance braking unit, utilizing electrical energy from forward electrical energy source or brake reverse recover energy, generates the reverse reluctance force to reduce the speed of rotating source to operate brake action. The driving design can be extended to absorb the brake reverse recovery energy for recycling in motives related applications, which can help to upgrade or replace the bake system of traditional mechanical vehicles or electrical vehicles, and improve the applicability for drive-by-wire development trend.

16 Claims, 7 Drawing Sheets

RELUCTANCE FORCE BRAKE DEVICE

FIELD OF THE INVENTION

The present invention is concerned with a method and apparatus to construct a reluctance force brake device, being related to an applicable reluctance force utilization design and implementation of the brake device and particularly to a brake device that employs reluctance force to accomplish the brake function of the operation tasks. The method and apparatus involves the alternative structure, for the replacement consideration of mechanical type brake device, in a wire-controlled scheme that can provide the brake function by production of the reverse reluctance force production while the brake action is required.

BACKGROUND OF THE INVENTION

The concept of applying drive-by-wire system for constructing an overall electric scheme, being feasible to the related applications, is mainly to replace mechanical elements of brake devices, which may employ oil pressure control and gears such as a fuel pedal and a steering wheel, by an electronic driving approach. SKF Co. and Bertone jointly developed a prototype concept car named FILO in 2001 that adopted the drive-by-wire technique with an integrated system control unit. As electronic signal transmission is more sensitive than mechanical operation and conforming the electronically controlled trend for the improvement of development for the conventionally mechanical type motion control, in the event of an accident, a corresponding passive protection measure may be taken for an integration driving, so called drive-by-wire, in an easier way. However, the market for this opinion is not mature for being still in lack of acceptable response capability about the safety operation mechanism of that type of vehicles. It is obviously that needing more research efforts involved for improving the safety acceptability. No doubt that the consideration for the brake function plays the important role for the techniques development.

Energy recycling and recovery related techniques and applications have been generally realized in the prior art. For instance, U.S. Pat. No. 6,202,782 to Hatanaka issued Mar. 20, 2001, disclosed a technique for recovering thermal energy that used two flywheels to transform mechanical energy into electric energy and store the energy in a battery to design the operation procedures for reusing the braking energy for a hybrid vehicle propulsion system. To increase the braking power without exceeding a predetermined braking power and focus on the action apparatus used in electric motor vehicles was addressed in U.S. Pat. No. 5,377,791 to Kawashima et al. issued Jan. 3, 1995. However, the method for the recovery energy applying to do the brake operation was not elaborated herein. The mechanical structure needed to actuate the brake function also took a greater proportion in the system design. The prior art described in patents does not explicitly cover both the operation consideration and steps related to the method and apparatus for design concept about how to utilize the recovery braking energy with/without energy feedback flow and the auxiliary energy source is also taken into account to improve the brake effectiveness. In fact, an electric-driven brake device is still the apparently technical bottleneck for the drive-by-wire vehicle system development and has to be explored for breakthrough.

The United States Environmental Protection Agency (US-EPA) has defined Federal Test Procedure 75 (FTP75), targeting an electrical vehicle (EV) that regulates brake test mechanisms and processes, including frequency/speed of rotation, operation ratio range of torque, and so forth. It can be clearly observed that while testing the present electrical vehicles according to FTP75, the ratio of energy deployment and operation under the brake conditions is still excessively high. The brake performance and reliability are no doubt the important examination factors needed to put to the test. All this mentioned above indicates that while the present vehicles have progress on the issues of energy conservation and recovery energy application, there are still no overall effective solutions to solve the problem of energy consumption during braking process, and no verbosity the more challengeable research topic for the development of present electrical vehicles.

For the vehicle body designed with mechanical transmission, the braking mechanism has even a greater field to be discussed for system performance upgrading. Conventional brake operation based on the mechanical transmission is usually accomplished through plate brakes and speed reducing mechanisms. For simplicity, they generally can be divided into drum type brakes and disk type brakes. The ordinary vehicles mostly adopt the design of disk type brakes on the front wheels to perform the brake action and drum type brakes on the rear wheels as well. The function of the drum type brake is acting like a clip, which is spread to increase friction effect on the brake linings to reduce the speed of the vehicle. As for the disk type brake, it uses a clip-like component to clamp symmetrical disk mounted on the rotation axle to achieve the brake function. The disk type brake can stop the vehicles at a shorter distance than the drum type brake, thus is safer in this discussion opinion. Besides, some vehicles are also coupled with a brake-locking prevention function, such as an anti-brake system (ABS), to improve safety. However, these mechanically dominated brake devices still require brake oil and some pollutants for the operation. In terms of energy deployment, converting kinetic energy to thermal energy involves heat dissipation. The temperature under the heat reaction status could reach several hundred degrees Celsius. This mechanical mechanism technique still needs further improvement in the opinion of environmental protection and energy utilization, especially for the research of drive-by-wire vehicles. Moreover, the service life and severe life cycle of the conventional brake systems is not predictable because the affecting factors, which can be focus on wearing and aging, deteriorate systems during randomly occurred brake operation. Besides of that, the maintenance for safety concern also makes it relatively expensive to replace the brake elements while considering the cost in specific time intervals.

The feasibility to operate the switched reluctance (SR) machines, the electrical machines with double-salience that without winding in its rotor, and owning the advantages of high power density, high robustness with rigid structure and temperature allowance, simple structure for low materials and manufacturing cost, wide speed range, and so on, is proved under assigned brake function in published lectures. In *IEEE Transactions on Magnetics,* 39(5), 3253 (2003), Osamu Ichinokura et al. have developed the evaluation simulation model of SR machines, including the dynamic behavior calculation for generator utilization, being useful for analysis and design. The study has also shown that SR machines can meet the requirements for propulsion application using microcontroller-based drives by Robert B. Inderka et al. published in *IEEE Transaction on Industrial Electronics,* 49(1), 48 (2002). Hereafter, to apply the high environmental robustness reluctance force production source to achieve the objectives, which can construct the drive-by-wire vehicles concrete concept and enlarge the reluctance force application fields, both by the means of the energy reused concept based on the transiently required reverse reluctance force supplying for brake function is the original invention motivation.

SUMMARY OF THE INVENTION

In view of the aforesaid problems, the object of the present invention is to provide a reluctance force brake device to aid or replace the brake systems used in the conventional vehicles or electrical vehicles, and can recycle the braking energy of the electrical vehicles and provide the reverse reluctance force for braking.

In order to achieve the foregoing object, the reluctance force brake device, according to the present invention, mainly executes the brake action for a rotating source. The rotating source generates mechanical energy, which is output through the connecting rotation axle. The reluctance force brake device includes a reluctance braking unit and a driving unit. The reluctance braking unit is coupled with the rotation axle to generate the reluctance force in the reverse direction comparing with the axle rotation direction by electric energy supplying, to reduce the rotation speed of the axle. The driving unit is electrically connected to the reluctance braking unit, to transform electric energy to drive the reluctance braking unit.

The foregoing, as well as additional objects, advantages and salient features of the invention will be more readily apparent from the following detailed description, which proceeds with reference to the accompanying drawings.

DESCRIPTION OF THE PREFERRED EMBODIMENTS

The reluctance force brake device according to the invention uses reluctance force as motive energy required for braking. It not only can be adopted for usage of electrical or conventional vehicles, it can also be widely adopted for application on various types of kinetically or rotationally mechanical equipments and facilities.

Figure 1:
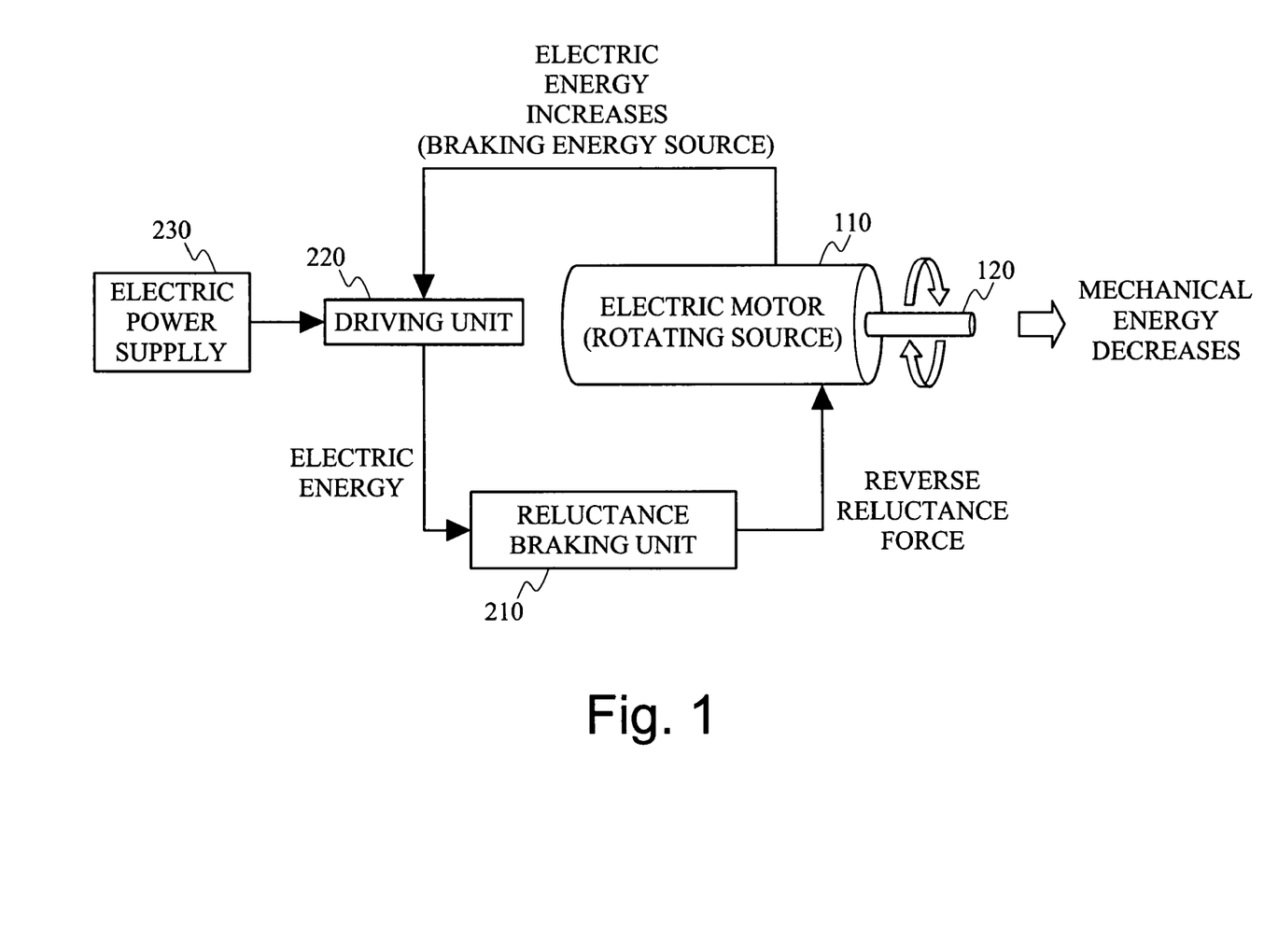
FIG. 1 is a schematic view of a first embodiment of the invention, depicted the main concept of the present invention.

Referring to FIG. 1 for a first embodiment of the present invention adopted for usage on broadly defined electric machinery includes electric carriers, electric tools, and even large household appliances, such as washing machines and the like. The electric machinery (not shown in the drawing) provides electric energy through a power supply circuit (not shown in the drawing). An electric motor 110 is provided as rotating source to transfer electric energy to mechanical energy, which is output through a rotation axle 120. In this embodiment, the reluctance force brake device includes a reluctance braking unit 210, a driving unit 220 and an electric power supply 230. The electric motor 110 is the main braking mechanism to perform brake action.

Figure 2:
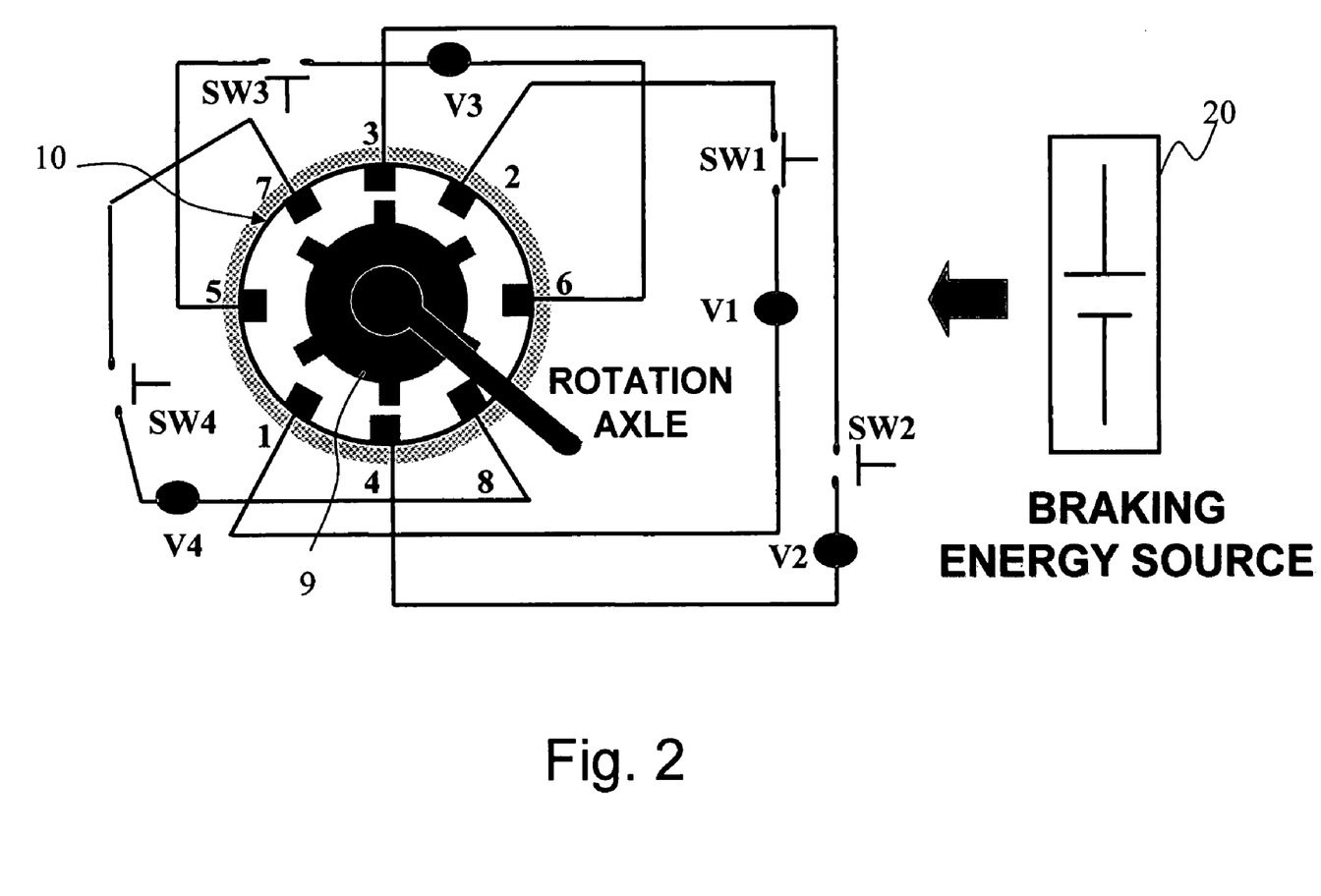
FIG. 2 is a schematic view of the principle and implementation of the SR machine, partially in approximately cross section, of a known SR machine structure.
Figure 3:
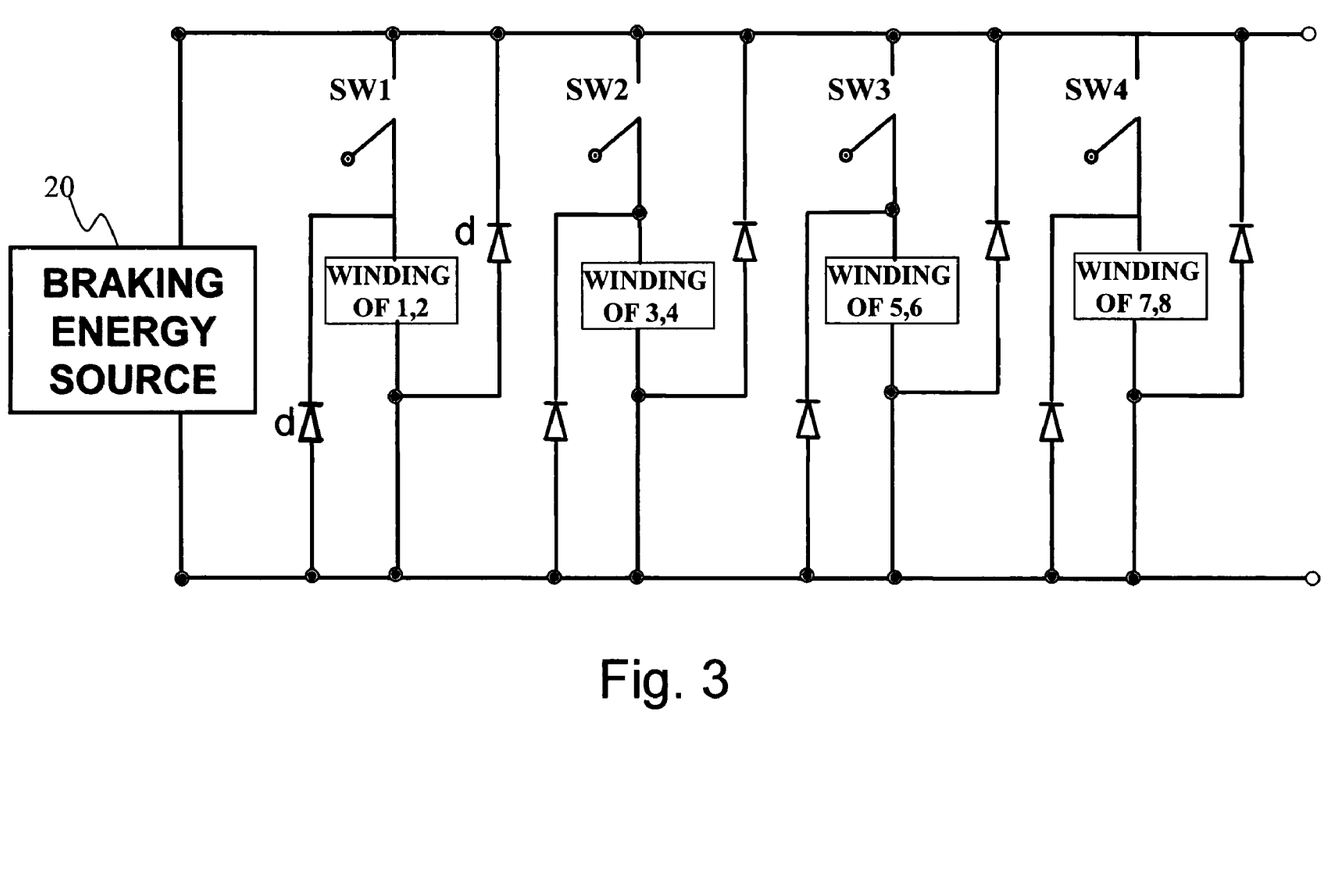
FIG. 3 is a schematic view of the implementation of the SR machines driving unit, partially represents one kind of the standard circuits and overall topologies related to driving phases.

The reluctance braking unit 210 is coupled with the electric motor 110 or the rotation axle 120, to generate reluctance force through electric energy. In practice, it may be a reluctance motor, preferably a switched reluctance (SR) machine. Before elaborating the applications of the reluctance braking unit 210, its operation principle and characteristics are described as follows:

Referring to FIGS. 2 and 3, the reluctance motor 10 (the motor is taken as an example in the embodiment, but is not the limitation. The reluctance motor 10 has a four-phase electric input, and the numbers of poles of the stator and rotor are eight and six, respectively, and denoted as 8/6). The structure representation of the reluctance motor 10 mainly includes stator poles 1–8 and a rotor 9 for ease of introduction. The electric power supply circuit includes control switches, which is denoted by SW1–SW4. The supplying voltage controlled by the control switches SW1–SW4, according to the rotor position and relatively desired actuation phase for producing reluctance force in reverse direction, is represented by V1–V4, respectively. The basic principle of the reluctance motor 10 is channeling the magnetic path through where the magnetic resistance is the least. Hence when current conducts through the pole sets (in this example, it can be said to be the following pole pairs: (1,2), (3,4), (5,6), and (7,8) for related actuation phases) corresponding to the stator poles 1–8, the force, so called reluctance force, is generated to channel the magnetic path in the direction which tends to have the minimum magnetic resistance, which means the angle/position that the least reluctance exists as well. Reluctance can be defined further that the value equals to the ratio of magneto-motive force to magnetic flux. Namely, the reluctance force makes the rotor 9 tend to face that pole set of the stator. The reluctance force related torque expression could be contained and given in the following equation:

$$T_e = \sum \frac{1}{2} i_x^2 \frac{\partial L_x}{\partial \theta}$$

Where $T_e$ = output torque $i$ = phase conduction current $L$ = equivalent magnetic inductance associated with the reluctance and exists the approximately inverse proportion with each other $\theta$ = rotor angle suffix $x$ means phase expression.

The reluctance motor 10 is an electric motor. As mentioned above, it can output reluctance torque to drive the rotor to the angle/position where the equivalent magnetic inductance is the maximum (means the reluctance is the minimum). The reluctance motor 10 may be rotary or linear type. The rotor 9 may be designed and placed to be internal or external motion type structure. Besides, the coils of the stator poles 1–8 are wound in an overlapped fashion or distributed in many phases to be magnetized in a single phase or multiple phases at the same time. When the reluctance motor 10 rotates, generally the phase is magnetized while the related phase equivalent magnetic inductance either varies in increasing or decreasing. In the same means, while the equivalent magnetic inductance changes the variation fashion, magnetization stops.

To people skilled in the art, the reluctance motor is a rough, inexpensive motor with low material cost as described in the former introduction. It can provide a relatively large torque, and the rotor structure is suitable for high-speed rotation under severe environment. Moreover, it can withstand a higher temperature, thus is a desirable driving source for brake operation.

For the present invention, the reluctance motor has many advantages such as high power density, withstanding high temperature allowance, rigid structure, and so forth. It meets the requirements of the braking mechanism that operates in tough and demanding environments.

The electric energy source required by the reluctance motor 10 may be an electric power supply 230 (FIG. 1) or a braking energy source 20 generated by the energy transformation between the kinetic energy and electric energy of an electric motor 110 during braking operation. It mainly presents in the form of transient voltage increasing. In terms of energy recycling, using the braking energy source 20 is preferable. But for fully considering the brake performance and safety, the electric power supply 230 may be used as an auxiliary usage for electric energy supplying. In practice, the electric power supply 230 may be a first battery (not shown in the drawings) that recovers electric energy in the electric machinery, or an extra second battery (not shown in the drawings) as well. Generation of the braking energy source 20 is described as follows: when the electric motor 110 performs a braking action, mechanical energy outputted by the electric motor 110 decreases; the reduced energy incurs abruptly a high voltage and a corresponding return current in the power supply circuit for the electric motor 110. The voltage may be called regenerative voltage and a braking energy source 20 is existed herein. Application of the recovery energy may adopt the design that includes the driving unit 220. In practice, the driving unit 220 may be an asymmetrical half-bridge converter, as shown in FIG. 3. Each limb will be channeled through that related to the desired windings of the pole sets by current for performing the brake function. At switch-off the current transfers from the switches to flow through the diodes d of the limb.

Figure 4:
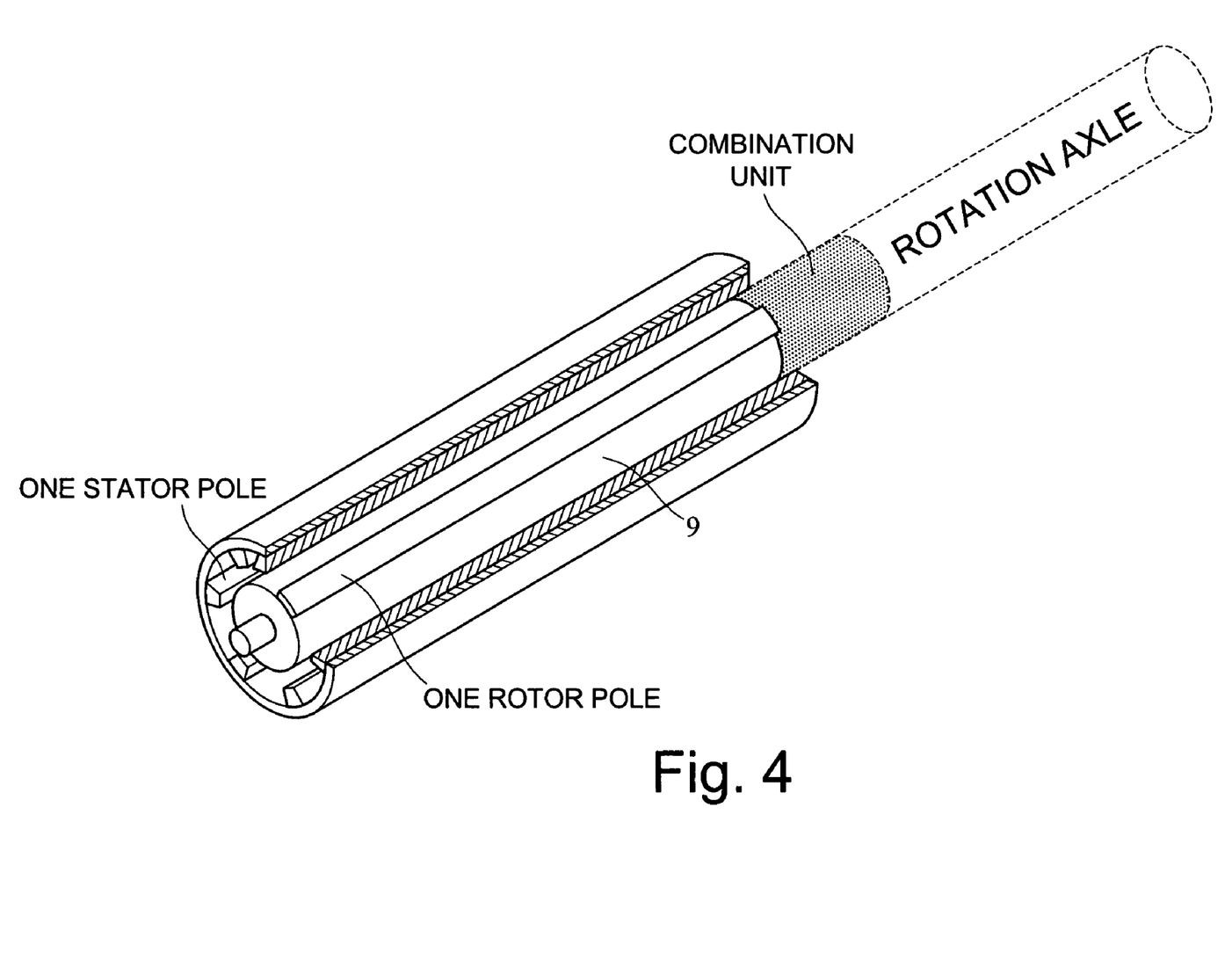
FIG. 4 is one perspective drawing of the preferred embodiment with simplified structure design view of the reluctance braking unit being shown schematically.

Referring to FIG. 1 again, when the electric motor 110 is under the ordinary operating condition, the reluctance braking unit 210 is not activated. It is driven by the electric motor 110 to rotate. When the braking action starts to execute, the electric power supply 230 provides electric energy, and the reluctance braking unit 210 generates a reluctance force which opposes the rotational direction of the rotation axle 120 by the output of electric motor 110. Therefore, the braking and speed reducing function is generated and achieved. Next, the power supply circuit of the electric motor 110 may transmit reverse energy through the build-up energy flow absorbing source (braking energy source) while braking takes place. The energy may be supplied to the reluctance braking unit 210 through the driving unit 220 to accomplish the energy recycling and reused purpose. Moreover, practically the reluctance braking unit 210 can perform the brake function without violent reversion of the rotation direction of the electric motor 110 or the rotation axle 120 by providing a reverse force to diminish the rotational momentum smoothly. As shown in FIG. 4, depicted one simplified structure of the reluctance braking unit originated from the structures of SR machines. In practical applications, the rotor 9 can be designed to be the structure with merely two salient poles to produce the flux through path. The physical reluctance concept for the magnetic flux channels through the path with the minimum reluctance is applied for realizing this embodiment as well. The supply of the voltage for forming the magnetic flux is controlled by the control switches (not shown in the drawing) according to the position of rotor 9 for generating reluctance force in desired direction. As the brake action is required, the stator pole pair, being the closest to the poles of rotor 9 or decided by the specific sequence set for rotation direction, can be either actuated by impressing electric energy on the winding at the shortest time for emergency condition or rotated using controlled voltage supply command sequence in the reverse direction to achieve this function. This embodiment is arranged to provide a comparative thinking for possible application in a concrete scheme. The combination unit, denoted in FIG. 4, could be implemented by mean of coupling connect design with consideration of manufacturing ease issue, such as union welding, axle extension, and so on.

Figure 5:
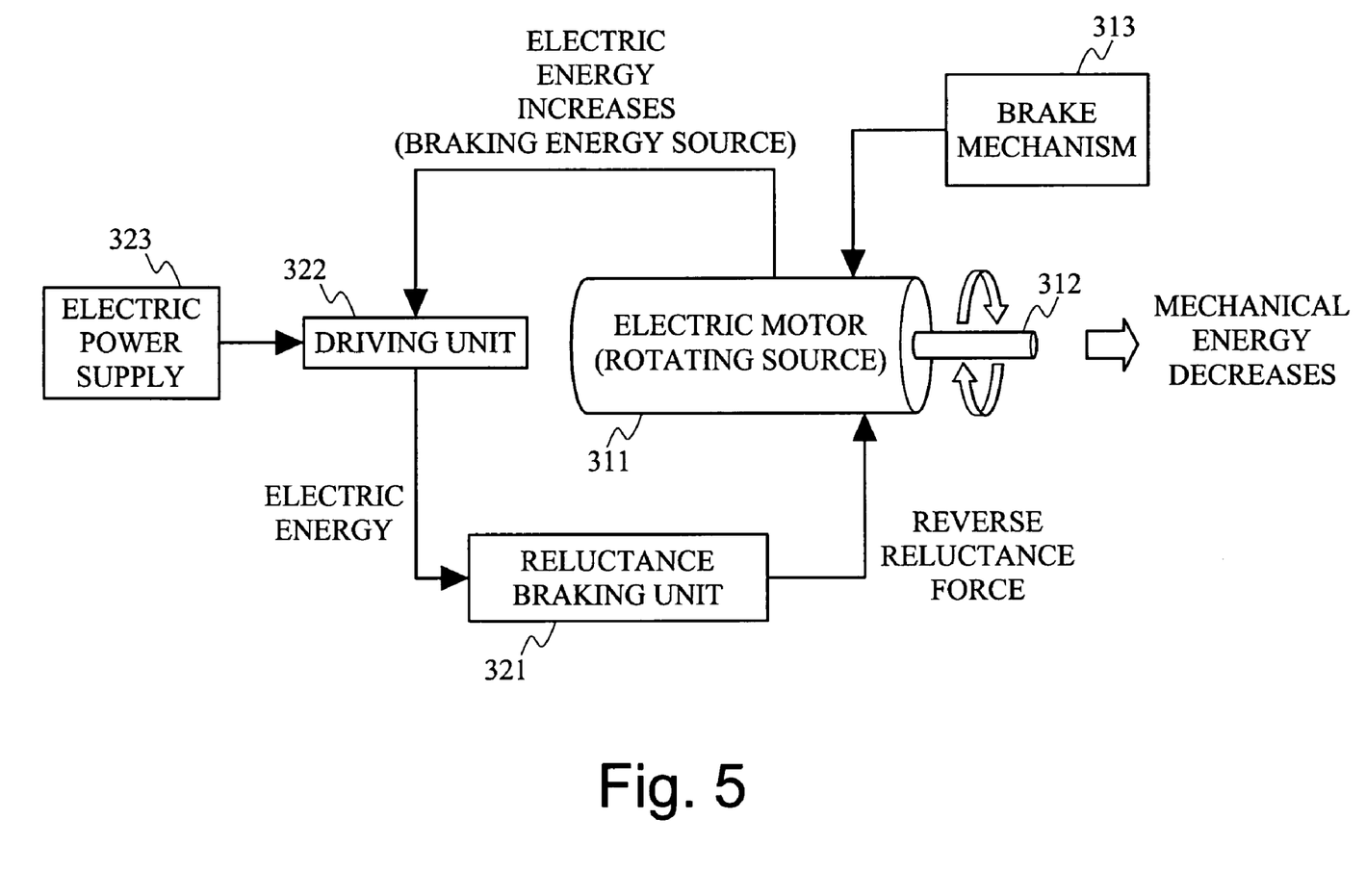
FIG. 5 is a schematic view of a second embodiment of the invention, particular for additional brake systems related applications.

To refer to FIG. 5 for a second embodiment of the invention and the concept can be describe further. The electric machinery (not shown in the drawing) is operated in coordination to a conventional brake mechanism 313, such as an ABS, drum type brake, disk type brake and a combination thereof, or other electric brake control systems applied on an electric motor 311 or rotation axle 312. In this embodiment, the reluctance force brake device functions as an auxiliary brake device. In this condition, which does not require to supply relatively great reverse reluctance force for not only one brake mechanism existed, the electric power supply 323 may be dispensed with. Electric energy required by the reluctance braking unit 321 may be only the recovery energy provided by the driving unit 322 partially constructed with brake energy source from the energy transformation flow. This embodiment plays the role to own the competence for providing the reverse reluctance force for auxiliary braking.

In addition to the electric vehicle depicted in the embodiment mentioned above, the mechanical apparatus that uses internal combustion energy for a rotating source such as gasoline engines or diesel engines, may also adopt the reluctance force brake device of the present invention to replace the existing brake system, and to increase the electrification proportion.

Figure 6:
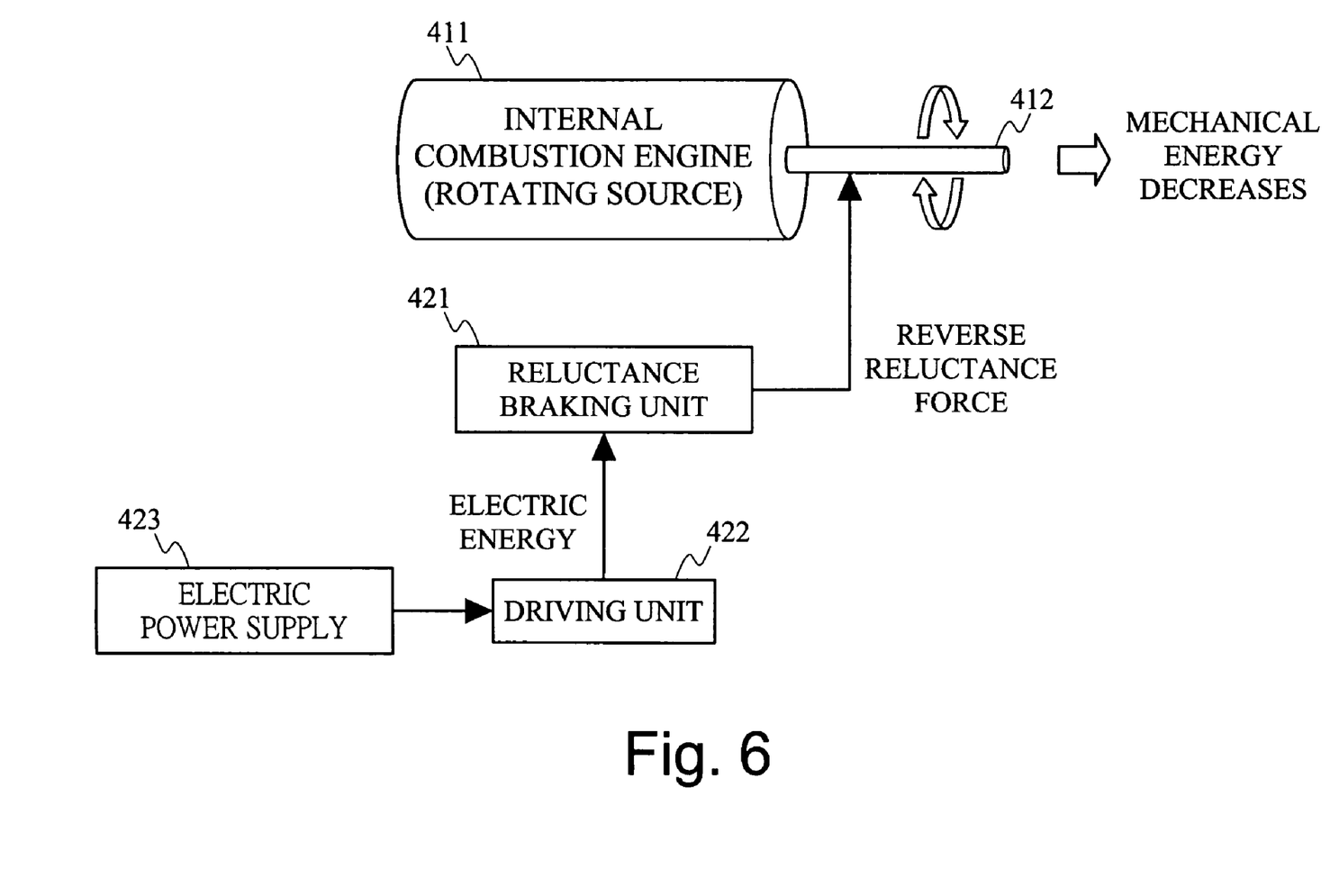
FIG. 6 is a schematic view of a third embodiment of the invention, particular for internal combustion engine related applications.

Refer to FIG. 6 for a third embodiment of the invention. An internal combustion engine 411 transforms the thermal energy of fuel to mechanical energy and output through a rotation axle 412. The reluctance force brake device provides the primary energy source for braking. The techniques is similar to the previous embodiments, a driving unit 422 uses the electric energy of an electric power supply 423 to drive a reluctance braking unit 421 to generate a reverse reluctance force. Depending on the coupling approach between the reluctance braking unit 421 and the internal combustion engine 411 or rotation axle 412, the reverse reluctance force may be applied on the internal combustion engine 411 or the rotation axle 412.

Figure 7:
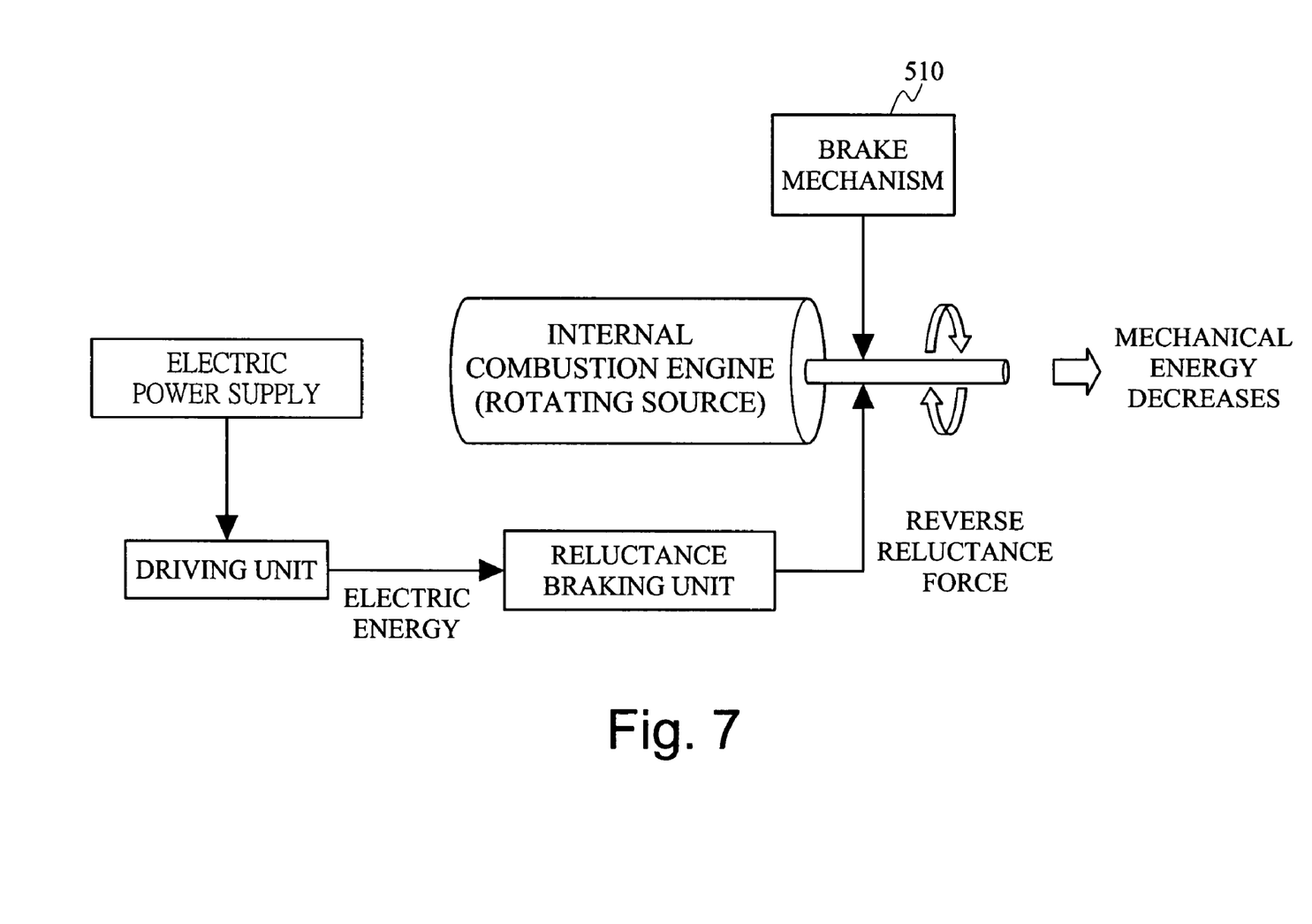
FIG. 7 is a schematic view of a fourth embodiment of the invention, particular for conventional mechanical mechanism related applications with rotation and brake.

Referring to FIG. 7, for existing vehicles installed with a gasoline or a diesel engine, though the brake mechanism 510 has already existed, the reluctance force brake device of the invention can still be added and installed to reduce the load and wearing of the existing brake mechanism 510, and to increase electrification proportion and operation safety as well.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A reluctance force brake device for executing brake action of a rotating source which is coupled with a rotation axle to transform electric energy from an electric power supply circuit to mechanical energy and output through the rotation axle, comprising:
    a reluctance braking unit coupled with the rotation axle to generate a reverse reluctance force through the electric energy to reduce the rotation speed of the rotation axle; and
    a driving unit connecting electrically to the reluctance braking unit to receive and transform the electric energy to drive the reluctance braking unit;
    wherein the driving unit is an asymmetrical half-bridge converter to recover a regenerative voltage of the electric power supply circuit to supply the reluctance braking unit to generate a reluctance force.

2. The reluctance force brake device of claim 1, wherein the reluctance braking unit is a reluctance motor.

3. The reluctance force brake device of claim 1, wherein the reluctance braking unit is a switched reluctance (SR) machine.

4. The reluctance force brake device of claim 1, wherein the reluctance braking unit is directly coupled with the rotating source and to rotate synchronously with the rotation axle.

5. The reluctance force brake device of claim 1, wherein the driving unit is connected to an electric power supply to receive electricity and supply the electric energy.

6. The reluctance force brake device of claim 5, wherein the electric power supply is a first battery primarily absorbing recovery electric energy of the rotating source or an extra second battery.

7. The reluctance force brake device of claim 1, wherein the rotation axle is coupled with a brake mechanism.

8. The reluctance brake device of claim 7, wherein the brake mechanism is a disk type brake system, a drum type brake system or a combination of the disk type brake system and the drum type brake system.

9. The reluctance force brake device of claim 1, wherein the rotating source is an electric motor.

10. A reluctance force brake device for executing braking action of a rotating source which is coupled with a rotation axle to transform electric energy from an electric power supply circuit to mechanical energy output through the rotation axle, comprising:
    an electric power supply to provide electric power;
    a reluctance braking unit coupled with the rotation axle to generate a reverse reluctance force through the electric energy to reduce the rotation speed of the rotation axle; and
    a driving unit connecting electrically to the reluctance braking unit to receive and transform the electric energy received from the electric power supply to drive the reluctance braking unit;
    wherein the electric power supply is a first battery primarily absorbing recovery electric energy of the rotating source or an extra second battery.

11. The reluctance force brake device of claim 10, wherein the reluctance braking unit is a reluctance motor.

12. The reluctance brake device of claim 10, wherein the reluctance braking unit is a switched reluctance (SR) machine.

13. The reluctance force brake device of claim 10, wherein the reluctance braking unit is directly coupled with the rotating source and to rotate synchronously with the rotation axle.

14. The reluctance force brake device of claim 10, wherein the rotation axle is coupled with a brake mechanism.

15. The reluctance force brake device of claim 14, wherein the brake mechanism is a disk type brake system, a drum type brake system or a combination of the disk brake system and the drum brake system.

16. The reluctance force brake device of claim 10, wherein the rotating source is an internal combustion engine.

* * * * *